United States Patent [19]

Fuzisawa et al.

[11] 4,161,083
[45] Jul. 17, 1979

[54] **METHOD FOR VESSEL CULTIVATION OF *LENTINUS EDODES***

[75] Inventors: Noriyoshi Fuzisawa, Sakura; Kenichi Hattori, Musashino, both of Japan

[73] Assignee: Kao Soap Co., Ltd., Tokyo, Japan

[21] Appl. No.: 910,953

[22] Filed: May 30, 1978

[30] Foreign Application Priority Data

Jul. 29, 1977 [JP] Japan ................................. 52-91012

[51] Int. Cl.² ............................................. A01G 1/04
[52] U.S. Cl. ............................................. 47/1.1; 71/5
[58] Field of Search ................................ 47/1.1; 71/5

[56] References Cited

U.S. PATENT DOCUMENTS

| 4,083,144 | 4/1978 | Fuzisawa et al. ................. 47/1.1 |
| 4,083,145 | 4/1978 | Fuzisawa et al. ................. 47/1.1 |

FOREIGN PATENT DOCUMENTS

| 45-16050 | 6/1970 | Japan ........................................... 47/1.1 |
| 47-39026 | 10/1972 | Japan ........................................... 47/1.1 |
| 7113485 | 4/1973 | Netherlands ................................ 47/1.1 |

*Primary Examiner*—Robert E. Bagwill
*Attorney, Agent, or Firm*—Blanchard, Flynn, Thiel, Boutell & Tanis

[57] ABSTRACT

A method for the vessel cultivation of *Lentinus edodes* in which seed fungi of *Lentinus edodes* are inoculated into a culture medium in a cultivation vessel comprising mainly light-impermeable portions but including some localized light-permeable portions, taking out the culture medium from the vessel after hyphae have been sufficiently developed in the culture medium and subjecting the culture medium to a fruiting body-producing treatment.

9 Claims, 1 Drawing Figure

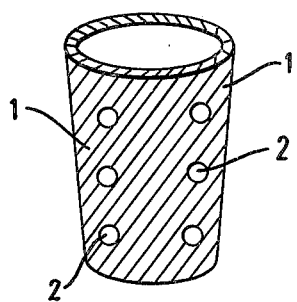

METHOD FOR VESSEL CULTIVATION OF *LENTINUS EDODES*

BACKGROUND OF THE INVENTION

Field of the Invention

The present invention relates to a method for the vessel cultivation of *Lentinus edodes* in which *Lentinus edodes* is cultivated in a vessel such as a bottle or bag, the culture medium is taken out from the vessel after development of hyphae and fruiting bodies are produced from the mushroom-generating surface of the culture medium, excluding the bottom surface thereof, wherein the generating position and the total number of fruiting bodies can optionally be controlled.

The applicants have previously invented and described a method in which fruiting bodies of *Lentinus edodes* are produced from the mushroom-generating surface of a culture medium promptly and with assurance of success (see the specification of Japanese Pat. application No. 83133/76, corresponding to U.S. Ser. No. 808,977, filed June 22, 1977). It is a principal object of the present invention to improve this method in such a manner that the generating positions and the total number of fruiting bodies of *Lentinus edodes* can optionally be controlled by controlling the radiation applied to the mushroom-generating surface of the culture medium, whereby fruiting bodies having a high commercial value can be produced with assured success.

In order to be commercially acceptable, the raw fruiting bodies of *Lentinus edodes* should have an umbrella or cap portion diameter of at least about 3 cm, generally from 4 to 6 cm. In the vessel cultivation of *Lentinus edodes*, in order to grow and produce large quantities of fruiting bodies as rapidly as possible, optimum conditions for the growth of *Lentinus edodes* are employed, but under such optimum growing conditions, the number of fruiting bodies produced in one culture medium is increased. Since the total weight of fruiting bodies that can or should be produced in one culture medium naturally is limited, if the number of fruiting bodies is thus increased, the sizes of the respective fruiting bodies are inevitably decreased and the quantity of commercially acceptable fruiting bodies, namely, fruiting bodies having an umbrella portion diameter of at least 3 cm, is reduced. As a procedure for overcoming this defect, there has been proposed a method in which the fruiting bodies are thinned out. However, this method requires much time and labor and is not satisfactory for practical commercial purposes.

SUMMARY OF THE INVENTION

We have developed a method for controlling the number of fruiting bodies. According to our invention, in the vessel cultivation of *Lentinus edodes*, the number of generated fruiting bodies of *Lentinus edodes* can be controlled by using a vessel which is light-impermeable as a whole but which includes localized areas of light-permeable portions (namely, a vessel comprising portions which block transmission of light rays and other portions which permit free transmission of light rays), so that the light rays are applied only on discrete, localized areas of the mushroom-generating surface of the culture medium.

More specifically, in accordance with the present invention, there is provided a method for the vessel cultivation of *Lentinus edodes* comprising inoculating seed fungi of *Lentinus edodes* into a culture medium in a vessel, taking out the culture medium from the vessel after hyphae have been sufficiently developed in the culture medium and subjecting the culture medium to a fruiting body-producing treatment, said method being characterized in that a vessel comprising mainly light-impermeable portions, but including some localized light-permeable portions, is used as the cultivation vessel.

The shape of the vessel that is used in the present invention is not particularly critical, provided that the culture medium containing developed hyphae can be taken out as a unit from the vessel. For example, a wide-mouthed bottle, a cup-like vessel, a bag, a cylindrical vessel or a square pillar-like vessel can be used. However, in all cases, the vessel should have a structure such that light rays can be applied to localized areas of the mushroom-generating surface of the culture medium when it is present in the vessel.

BRIEF DESCRIPTION OF THE DRAWING

The drawing is a perspective view of a vessel for use in performing the method according to our invention.

The present invention will now be described by reference to the accompanying drawing which pertains to an embodiment in which a wide-mouthed bottle is used as the cultivation vessel. The appearance of the wide-mouthed bottle is as shown in the drawing. The hatched portion 1 of the vessel is light-impermeable, and the circular portions 2 are light-permeable. As is well-known in the art, light radiation is necessary for the growth of *Lentinus edodes*, especially during the period of the growth of hyphae. The present invention utilizes this fact in an unobvious way for the vessel cultivation of *Lentinus edodes*. Hyphae of *Lentinus edodes* are grown by using a wide-mouthed bottle as shown in the drawing, and after development of the hyphae, the culture medium is taken out, as a unit, from the wide-mouthed bottle. The bed of culture medium is then subjected to a fruiting body-producing treatment, for example, a low temperature treatment. Fruiting bodies grow only from the portions of the mushroom-generating surface to which light was applied during the hyphae-forming stage and no fruiting bodies grow from the other portions to which no light was applied. Since light radiation is indispensable for the growth of *Lentinus edodes* during the hyphae-growing period, even if the entire surface of the culture medium, after it is taken out from the vessel, is exposed to light radiation during the fruiting body-generating period, fruiting bodies are produced only from the portions to which light radiation was applied during the hyphae-growing period.

According to the method of the present invention, there is achieved a direct control of the number of fruiting bodies that grow from the culture medium. This has been impossible according to the conventional techniques of the vessel cultivation of *Lentinus edodes*. By controlling the positions and the areas of the light-permeable portions of the vessel, which otherwise is light-impermeable as a whole, the number of generated fruiting bodies can be controlled.

A wide-mouthed bottle which has heretofore been used for the vessel cultivation of *Lentinus edodes* is made of a light-permeable, heat-resistant, synthetic resin such as polypropylene or glass, and it is light-permeable as a whole. When such wide-mouthed bottle is used as an example of a vessel for use in the present invention, it is necessary to provide light-impermeable portions on the bottle. As the methods for forming such light-impermeable portions, there can be employed a method in which portions of the outer wall or the inner wall of the wide-mouthed bottle are made light-impermeable by printing or coating same with a light-impermeable ink or paint having preferably heat resistance, or a method in which a metal foil, a light-impermeable paper such as black paper, a clay, a light-impermeable plastic tape such as black tape or a light-impermeable plastic film such as black film is applied, coated or bonded to the above-mentioned portions of the wide-mouthed bottle, or a method in which a composite vessel formed by combining a light-impermeable bottle having a number of small open windows with a plastic bottle is employed, as well as various other methods. The surface portions of the vessel which are not rendered light-impermeable by one of the foregoing methods constitute light-permeable portions of the vessel. At any rate, the wide-mouthed bottle that is used in the present invention is light-impermeable as a whole but it includes discrete, localized, light-permeable portions. The method of preparing such a wide-mouthed bottle is not particularly critical. Bag-like and cylindrical vessels can be formed in similar fashion.

The light-permeable portions 2 will now be described. The shape of the light-permeable portions is not critical but they may have a circular, triangular, square or other shape (a circular light-permeable portion is illustrated in the drawing). In the case of circular light-permeable portions, it is preferred that the diameter of each circle is from 5 to 10 mm. If the diameter is too small, the effect of the light rays for effecting the growth of fruiting bodies is not sufficient, whereas if the diameter is too large, a plurality of fruiting bodies are produced from one light-permeable portion and the desired effect of controlling the total number of fruiting bodies produced cannot be attained. The number of light-permeable portions formed on one vessel is optional but it is preferred that this number be changed depending on the weight of the culture medium contained in the vessel and the average weight of the fruiting bodies to be produced. In general, the total weight of fruiting bodies generated from one culture medium is about 20% of the weight of the culture medium, on the average. The weight of raw fruiting bodies having a high commercial value is about 10 g apiece on the average. Accordingly if it is intended to produce such high quality fruiting bodies, the number of light-permeable portions can be calculated according to the following formula:

$$N=(w\times 0.2)/10$$

wherein N is the number of light-permeable portions provided in the vessel and W denotes the weight (g) of the culture medium.

The positions of the light-permeable portions are distributed substantially uniformly and equidistantly on the fruit body-producing surface so that the umbrella or cap portions of each two adjacent fruiting bodies do not impinge against each other in order that said umbrella portions of respective fruiting bodies do not become deformed by each other.

The intensity of light radiation applied through the light-permeable portions onto the culture medium in which hyphae are growing can be the light intensity customarily used in the cultivation of Lentinus edodes. Hyphae grow even under an illumination as low as about 1 lux and also under an illumination of up to 1000 to 2000 luxes. Preferred illuminations are in the range of from 10 to 500 luxes. There is no substantial difference between illumination by artificial generated radiation (radiation emitted from an illuminating equipment) and solar radiation. With reference to the color of the radiation, when single wave length radiation is applied with the same energy, violet-to-blue radiation (having a wave length of about 400 m$\mu$ to about 450 m$\mu$) is most effective for the production of fruiting bodies and it is said that green-to-red rays (having a wave length of about 500 m$\mu$ to about 650 m$\mu$) are less effective. However, since green-to-red rays do not positively inhibit generation or growth of fruiting bodies, natural or white light artificial radiation can be directly applied without removal of green-to-red rays. The intended effect of the present invention can be satisfactorily attained by the use of ordinary natural radiation (solar radiation) or white light artificial radiation.

The materials used to make the culture medium are not particularly critical in the present invention, and the materials customarily used for the cultivation of *Lentinus edodes* can be used in the present invention. More specifically, there can be employed sawdusts of various woods, bagasse, rice hulls, old papers, paper lumps, rice bran, corn bran, wheat bran, and other various agricultural wastes and by-products. Further, porous polymeric substances or porous natural or synthetic aggregates (for example, light aggregates) impregnated with nutriments can also be used.

When hyphae of *Lentinus edodes* are cultivated by using a vessel which is light-impermeable as a whole, but which includes localized light-impermeable portions, and the culture medium is taken out from such vessel after sufficient development of the hyphae and then is subjected to a fruiting body-producing treatment, fruiting bodies are produced from the portions to which radiation was applied during the hyphae-cultivating period. Accordingly, the number of produced fruiting bodies and the size of respective fruiting bodies can be controlled by adjusting the number and sizes of the light-permeable portions.

Although it has long been known that radiation is necessary for generation and growth of *Lentinus edodes*, there has not been proposed the concept of directly controlling the number of produced fruiting bodies of *Lentinus edodes* in the vessel cultivation thereof by utilizing this known fact. Accordingly, the method of the present invention is a novel and unique method based on this hitherto unknown concept.

As will be apparent from the foregoing detailed description, the gist of the present invention resides in that, the vessel cultivation of *Lentinus edodes*, there is used a cultivation vessel which is light-impermeable as a whole, but which includes localized light-permeable portions. The portions of the culture medium to which radiation is applied during the hyphae-cultivating period are controlled, whereby production of an excessive number of fruiting bodies is prevented and large fruiting bodies having a high commercial value are produced in increased quantities. Accordingly, the present invention makes significant contributions to the art of cultivation of *Lentinus edodes*.

The present invention will now be described in detail by reference to the following Examples.

EXAMPLE 1

A culture medium was prepared by homogeneously mixing the following components:
Oak Sawdust: 6.9 parts by weight
Bagasse: 3.9 parts by weight
Defatted rice bran: 2.2 parts by weight
Water: 18.3 parts by weight Then, 600 g of the thus-prepared culture medium was placed in a wide-mouthed vessel having an inner capacity of 1000 ml and a mouth diameter of 11 cm. The outer surface portion of this wide-mouthed bottle was coated in advance with a carbon black-type heat-resistant black paint so that the bottle was light-impermeable as a whole but circular non-coated portions each having a diameter of 10 mm, were left at 12 points on the side wall of the vessel so that they were distributed substantially uniformly and equidistantly as light-permeable portions. Four inoculating holes having a diameter of 12 mm were formed substantially equidistantly along the inner surface of the side wall of the bottle, and in order to prevent intrusion of other fungi such as air-borne fungi, an air-filtering plug was set in the bottle mouth, and sterilization with pressurized steam was carried out at a temperature of 121° C. under a pressure of 1.2 Kg/cm$^2$ for 90 minutes. After cooling the contents of the vessel, seed fungi of Lentinus edodes were inoculated in the four inoculation holes and also on the top face of the culture medium.

Hyphae were cultivated at a temperature of 25° C. for 51 days under irradiation of white fluorescent lamp rays having an illuminance of about 200 luxes (the actual illuminance of the radiation applied on the culture medium in the bottle through the light-permeable portions was about 160 luxes). Then, the culture medium was taken out from the bottle and was subjected to a fruiting body-producing treatment at a temperature of 15° C. and a relative humidity of 85%. Rudiments of fruiting bodies were formed only on the light-permeated portions of the culture medium which had been exposed to the radiation during the cultivation of hyphae, and after 5 days, complete fruiting bodies of Lentinus edodes were formed in these light-permeated portions. One fruiting body was formed on each of the light-permeated portions which had been exposed to the radiation (12 fruiting bodies as a whole). The total weight of all the fruiting bodies and the average weight of one fruiting body are shown in Table 1.

For comparision, the cultivation was conducted in the same manner as described above except that there was used a conventional wide-mouthed bottle which was completely and entirely light-permeable and which had no light-impermeable portions. The results obtained are shown in Table 1. In this comparative run, the positions for the production of fruiting bodies were not fixed, and the number of produced fruiting bodies was large and the size of each fruiting body was relatively small.

Each of (1) the run according to the present invention and (2) the comparative run were carried out using five samples of the culture media. In each of the culture media treated according to the present invention, the umbrella portion diameter of each fruiting body was 4 to 5 cm and each fruiting body had a weight of about 10 g. Thus, fruiting bodies having a high commercial value were obtained in the runs according to the present invention. However, in the comparative runs, the majority of the fruiting bodies were inferior in commercial value because the umbrella portion diameter was less than 3 cm and the average weight was less than 4 g.

Table 1

Effect by Localized Irradiation in the Bottle Cultivation of Lentinus Edodes

| Culture Medium Sample No. | Produced Fruiting Bodies Number | Total Weight (g) | Average Weight (g) of One Fruiting Body |
|---|---|---|---|
| Run according to present invention | | | |
| 1 | 12 | 124 | 10.3 |
| 2 | 12 | 116 | 9.7 |
| 3 | 12 | 135 | 11.3 |
| 4 | 12 | 142 | 11.8 |
| 5 | 12 | 125 | 10.4 |
| Comparative Run | | | |
| 1 | 32 | 118 | 3.7 |
| 2 | 40 | 134 | 3.3 |
| 3 | 33 | 126 | 3.8 |
| 4 | 36 | 122 | 3.4 |
| 5 | 35 | 131 | 3.7 |

EXAMPLE 2

By using a culture medium having the composition set forth below, the cultivation of Lentinus edodes was carried out in the same manner as described in Example 1 except that the light-impermeable portion was formed by applying a black vinyl resin tape to the vessel:
Lauan sawdust: 8.3 parts by weight
Rice hulls: 3.6 parts by weight
Corn bran: 2.4 parts by weight
Water: 16.6 parts by weight Each light-permeable portion had a square shape of about 8 cm on each side, and radiation having an illuminance of about 100 luxes, which was emitted from a white fluorescent lamp, was applied (the actual illuminance on the culture medium was about 80 luxes). The results obtained are shown in Table 2. It will readily be understood that advantageous effects can be attained according to the present invention.

Table 2

Effect by Localized Irradiation in the Bottle Cultivation of Lentinus Edodes

| Culture Medium Sample No. | Produced Fruiting Bodies Number | Total Weight (g) | Average Weight (g) of One Fruiting Body |
| --- | --- | --- | --- |
| Run according to present invention | | | |
| 1 | 12 | 129 | 10.8 |
| 2 | 12 | 145 | 12.1 |
| 3 | 12 | 136 | 11.3 |
| 4 | 12 | 132 | 11.0 |
| 5 | 12 | 140 | 11.7 |
| Comparative run | | | |
| 1 | 48 | 139 | 2.9 |
| 2 | 52 | 148 | 2.8 |
| 3 | 44 | 126 | 2.9 |
| 4 | 50 | 142 | 2.8 |
| 5 | 45 | 133 | 3.0 |

EXAMPLE 3

A culture medium was prepared from the following components:
Lauan sawdust: 5.8 parts by weight
Rice hulls: 4.2 parts by weight
Potato starch grounds: 1.2 parts by weight
Defatted rice bran: 2.4 parts by weight
Water: 19.7 parts by weight A transparent bag composed of a polypropylene film having a thickness of $50\mu$ and having such a shape that when it was expanded, it had a bottom face of 10cm×10cm and a depth of 20 cm, was filled with 800 g of the culture medium. The height of the culture medium in the bag was 10 cm and the volume thereof was 1000 ml. The bag thus filled with culture medium was placed into an aluminum case (having a thickness of 0.5 mm, a bottom face of 10cm×10cm and a height of 10 cm) which had been molded so that the bag filled with culture medium fitted tightly therein. Four circular holes each having a diameter of 10 mm were formed on each of the four sides of the aluminum case (16 holes in total) so that they were uniformly distributed as light-permeable portions. The cultivation of Lentinus edodes was carried out in the same manner as described in Example 1. As a result, sixteen fruiting bodies, each having a weight of about 10 g on the average, were obtained in one culture medium. The total amount of produced fruiting bodies was 150 to 170 g. When the entire surface of the culture medium was exposed to radiation without using the above-mentioned aluminum case, the total weight of produced fruiting bodies was substantially the same as in the above run according to the present invention, but the number of the produced fruiting bodies was larger and many of them had a weight of 2 to 4 g.

The embodiments of the invention in which an exclusive property or privilege is claimed are defined as follows:

1. A method for the vessel cultivation of Lentinus edodes comprising inoculating seed fungi of Lentinus edodes into a culture medium in a vessel, subjecting the innoculated culture medium to radiation, taking out the culture medium from the vessel after hyphae have been sufficiently developed in the culture medium and subjecting the culture medium to a fruiting body-producing treatment, said method being characterized in that a vessel comprising mainly light-impermeable portions but including localized light-permeable portions is used as the cultivation vessel.

2. A method for the vessel cultivation of Lentinus edodes according to claim 1 wherein the light-impermeable portions consist of a synthetic resin or glass printed with a light-impermeable ink or coated with a light-impermeable paint.

3. A method for the vessel cultivation of Lentinus edodes according to claim 1 wherein the light-impermeable portions consist of a synthetic resin or glass to which a light-impermeable metal foil, a light-impermeable paper, clay, a light-impermeable plastic tape or a light-impermeable plastic film is applied, coated or bonded.

4. A method for the vessel cultivation of Lentinus edodes according to claim 1 wherein the light-permeable portions consist of a synthetic resin or glass or a composite material including plastics, glass and metal.

5. A method for the vessel cultivation of Lentinus edodes according to claim 1 wherein the vessel has a cup-like, bag-like or cylindrical shape.

6. A method for the vessel cultivation of Lentinus edodes according to claim 1 wherein the radiation consists of artificial rays or solar rays having an illuminance of 10 to 500 luxes.

7. A method for the vessel cultivation of Lentinus edodes according to claim 1 which comprises forming a bed of culture medium in an open-topped vessel having a plurality of separate spaced-apart light-permeable zones in the side wall thereof with the remainder of said side wall being light-impermeable, forming a plurality of open-topped see-inoculating and air-supplying holes in the side face of the bed of culture medium and extending along the inner surface of the side wall of the vessel, sterilizing said bed, then inoculating fungus seed of Lentinus edodes in the holes of the sterilized bed of said culture medium, cultivating said bed under light radiation transmitted through said light-permeable zones to generate hyphae of Lentinus edodes in the culture medium, then taking the bed, as a unit, out of the vessel, then subjecting the bed to mushroom-growing conditions effective to form fruiting bodies of Lentinus edodes which grow from the side faces of the culture medium at the portions thereof that were in registry with said light-permeable zones.

8. A method according to claim 7 in which the bed is cultivated at about 25° C. for a total of about 50 to 60 days and then said bed is subjected to mushroom-growing conditions at a temperature of about 15° to 20° C. for about 6 to 9 days to form the fruiting bodies.

9. A method according to claim 7 in which said light-permeable zones are of a size such that only one fruiting body grows from each portion of the culture medium that was in registry with a light-permeable zone.

* * * * *